US010122739B2

United States Patent
Warden et al.

(10) Patent No.: US 10,122,739 B2
(45) Date of Patent: Nov. 6, 2018

(54) ROOTKIT DETECTION SYSTEM AND METHOD

(71) Applicant: Dell Products L.P., Round Rock, TX (US)

(72) Inventors: David Warden, Leander, TX (US); Marshal F. Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/253,427

(22) Filed: Aug. 31, 2016

(65) Prior Publication Data

US 2018/0063166 A1    Mar. 1, 2018

(51) Int. Cl.
*H04L 29/06* (2006.01)
*H04L 9/32* (2006.01)

(52) U.S. Cl.
CPC ........ *H04L 63/1416* (2013.01); *H04L 9/3247* (2013.01); *H04L 63/0442* (2013.01); *H04L 63/061* (2013.01); *H04L 63/0823* (2013.01)

(58) Field of Classification Search
CPC ............... H04L 63/1416; H04L 63/061; H04L 63/0442; H04L 63/0823; H04L 9/3247
See application file for complete search history.

(56) References Cited

U.S. PATENT DOCUMENTS

| | | |
|---|---|---|
| 8,261,085 B1 * | 9/2012 | Fernandez Gutierrez ................... G06F 21/567 711/113 |
| 8,365,297 B1 * | 1/2013 | Parshin ................. G06F 21/575 713/2 |
| 8,584,242 B2 | 11/2013 | Lagar-Cavilla et al. |
| 8,701,193 B1 * | 4/2014 | Wong .................... G06F 21/564 713/189 |
| 9,319,426 B2 | 4/2016 | Webb et al. |
| 2006/0021029 A1 * | 1/2006 | Brickell .................. G06F 21/51 726/22 |
| 2008/0168560 A1 * | 7/2008 | Durie .................. H04L 63/1408 726/23 |
| 2011/0173699 A1 * | 7/2011 | Figlin ................. H04L 63/1408 726/23 |
| 2012/0254995 A1 * | 10/2012 | Sallam .................. G06F 21/554 726/22 |

* cited by examiner

*Primary Examiner* — Mohammed Waliullah
(74) *Attorney, Agent, or Firm* — Jackson Walker L.L.P.

(57) ABSTRACT

A rootkit detection method includes obtaining, from a target system, first data comprising raw data stored in a data block of a storage drive, checking the first data for known malware, and generating a first alert if known malware is detected. The drive may include a public key, the first data may include a digital signature based on the key, and checking the first data may include validating the signature. The method may be performed by a system management resource that sends a management request for a particular data block. Second data, corresponding to an operating system access of the particular data block, may be obtained and compared to the first data. Responsive to detecting a discrepancy, generating a second alert. The system management resource may be a cloud based server, a premise installed appliance, premise installed security server, or a management controller of the target system.

19 Claims, 2 Drawing Sheets

ROOTKIT DETECTION SYSTEM AND METHOD

TECHNICAL FIELD

The present disclosure generally relates to information handling system management and, more particularly, system management solutions for detecting rootkits in a managed system.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

An information handling system can be configured in several different configurations ranging from a single, stand-alone computer system to a distributed, multi-device computer system, to a networked computer system with remote or cloud storage systems.

Information handling systems of all types are susceptible to rootkits, i.e., any software application, program, or code designed to permit a presumably unauthorized user to access information handling system resources without detection. Rootkits may conceal privileged access to a system and may often enable ongoing operation of malware that can access and misuse data for criminal and other illicit purposes.

Sophisticated rootkits may subvert data presented to the operating-system, anti-virus/anti-malware software, and system administrators to avoid detection and removal. A rootkit might, as an example, return an inaccurate representation of disk data to anti-virus software. Rootkit detection is further complicated, perhaps somewhat ironically, by the common use of encryption technology, virtualization, and remote storage systems.

SUMMARY

Disclosed security-aware storage components and communication interfaces may detect hidden malware using a distinct security host, such as a cloud service, that includes awareness of encryption and operating environments to support a wide variety of system configurations. The security host may integrate security technology at each privileged layer of a stack and perform external verification to achieve detection in a greater variety of environments and with higher assurance.

Maintaining system security requires significant administrative and computational resources. Offloading the primary responsibility for detection and reporting to a remote service offers higher assurance. A cloud service could subscribe to multiple signature database services to achieve a higher detection rate. Dedicated security service servers can be subject to additional controls including restrictive firewall, OS, and application configuration; cross-validation among servers; intrusion detection; and live monitoring by a security administrator.

It would not be feasible for a large organization to provision many systems with as high an attention to detail. It would also be difficult and expensive for every organization to maintain the highest level of expertise and diligence in security administrators.

In accordance with a disclosed rootkit detection method, a rootkit detection method includes obtaining, from a storage subsystem of a target information handling system, first data comprising raw data stored in a data block of a storage drive within the storage subsystem, checking the first data for known malware; and generating a first alert responsive to detecting known malware in the first data. The storage drive might be implemented as a public-key certificate, signed by a trusted authority, that includes or otherwise indicates a unique identifier of the storage drive. The first data may include a digital signature, generated in accordance with the raw data and the public-key certificate, and checking the first data may include verifying the digital signature.

The method may be performed by a systems management resource and obtaining the first data may include sending, by the system management resource, a management request for a particular data block of the storage subsystem. The system management resource may comprise a rootkit detection system implemented as a cloud based server; a premise installed appliance; a premise installed security server; or a management controller of the target information handling system. The target information handling system may include a secure storage drive coupled to a managed host managed host that is configured to respond to the management request by returning raw data stored in the particular data block.

The method may include comparing the first data to second data, wherein the second data comprises data corresponding to an operating system access of the particular data block and, responsive to detecting a discrepancy between the first and second data, generating a second alert. The raw data may comprise encrypted raw data and the method may include requesting a decryption key from the target information handling system and, responsive to receiving the decryption key, decrypting the encrypted raw data to obtain decrypted data, wherein checking the first data comprises scanning the decrypted data.

The raw data may include one or more files necessary to load an operating system hosted by a file system and checking the first data may include comparing each of the one or more files necessary to load the operating system against an expected value, a verified digital signature, or both. The method may include emulating at least a portion of a boot process, identifying accessed files, comprising files accessed during the portion of the boot process, and checking the accessed files for known malware. Emulating at least a portion of the boot process may include emulating the boot process for a particular interval of time following the initiation of system boot, in which case the accessed files may include the files accessed by the boot process within the particular interval. The target information handling system may include a file system hosting a hypervisor and nested file systems comprising data files representing storage of guest operating systems. The raw data may include files necessary to load the guest operating systems.

The target information handling system may comprise a managed host system configured to respond to a management request for host configuration information by returning configuration lists indicating storage controllers and storage drives associated with the target information handling system, sending a management request for current host configuration information for the target information handling system, comparing a current storage configuration of the target information handling system to a previous storage configuration and, responsive to detecting a discrepancy, generating a third alert. Comparing the current storage configuration information may include retrieving as-built configuration information, indicative of an original configuration of the storage controllers and storage drives attached to the target information handling system, and comparing the as-built configuration information to the current configuration information. The target information handling system may be further configured to respond to management requests for host information by returning configuration lists indicating hypervisors and operating systems of the target information handling system.

The target information handling system may be configured to respond to management requests for a block of system RAM by returning digitally signed data corresponding to raw data in the block of system RAM. The method may include obtaining, from the storage subsystem of the target information handling system, unallocated data comprising raw data stored in an unallocated data block of the storage drive within the storage subsystem, scanning the unallocated data for known malware, and responsive to detecting known malware in the unallocated data, generating a fourth alert.

In accordance with a disclosed rootkit detection system that includes a processor and a computer readable medium, including processor executable rootkit detection instructions that, when executed by the processor, produce operations for identifying a target information handling system, comparing a current storage configuration of the target information handling system to a previous storage configuration, and, responsive to detecting a discrepancy, generating a first alert. First data, comprising raw data stored in a data block of a secure drive, may be obtained from a storage drive of the target information handling system, and the first data may be checked for known malware. Obtaining the first data may include sending a management request for a first data block to a secure drive configured to respond to such requests by returning raw or unaltered data from the first data block.

Responsive to detecting known malware in the first data a second alert may be generated. The first data may be compared to second data, comprising data corresponding to an operating system access of the data block, and, responsive to detecting a discrepancy, a third alert may be generated. Comparing the current storage configuration information may include sending a management request for host information to the target host system and receiving, in response, configuration information indicating current configuration information, which may include a list of storage controllers and storage drives and an indication of operating system(s) and hypervisor(s) if any. Comparing the current storage configuration information may further include retrieving as-built configuration information, indicative of an original configuration of the storage controllers and storage drives attached to the target information handling system, and comparing the as-built configuration to the current configuration.

In accordance with disclosed rootkit detection software, a computer readable medium includes processor executable rootkit detection instructions that, when executed by a processor, cause operations including identifying a target information handling system, comparing a current storage configuration of the target information handling system to a previous storage configuration, and, responsive to detecting a discrepancy, generating a first alert. First data, comprising raw data stored in a data block of a secure drive, may be obtained from a storage drive of the target information handling system, and the first data may be checked for known malware. Obtaining the first data may include sending a management request for a first data block to a secure drive configured to respond to such requests by returning raw or unaltered data from the first data block.

Responsive to detecting known malware in the first data, a second alert may be generated. If the first data contains no known malware, the first data may be compared to second data, comprising data retrieved by accessing the data block via the operating system, hypervisor, if any, and driver stack of the target information handling system. If a discrepancy between the first and second data is discovered, an alert may be generated.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that, for simplicity and clarity of illustration, elements illustrated in the figures have not necessarily been drawn to scale. For example, the dimensions of some of the elements may be exaggerated relative to other elements. Embodiments incorporating teachings of the present disclosure are shown and described with respect to the figures presented herein, in which.

DETAILED DESCRIPTION

In the following detailed description, specific exemplary embodiments in which disclosed subject matter may be practiced are described in sufficient detail to enable those skilled in the art to practice the disclosed embodiments. For example, details such as specific method orders, structures, elements, and connections have been presented herein. However, it is to be understood that the specific details presented need not be utilized to practice embodiments of disclosed subject matter. It is also to be understood that other embodiments may be utilized and that logical, architectural, programmatic, mechanical, electrical and other changes may be made within the scope of the disclosed subject matter.

The following detailed description is, therefore, not to be taken as limiting the scope of the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features may be described which may be exhibited by some embodiments and not by others. Similarly, various requirements may be described which may be requirements for some embodiments but not for other embodiments.

It is understood that the use of specific component, device, and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different elements, features, protocols, or concept names are utilized. Thus, each term utilized herein is to be given its broadest interpretation given the context in which that term is utilized.

Figure 1:
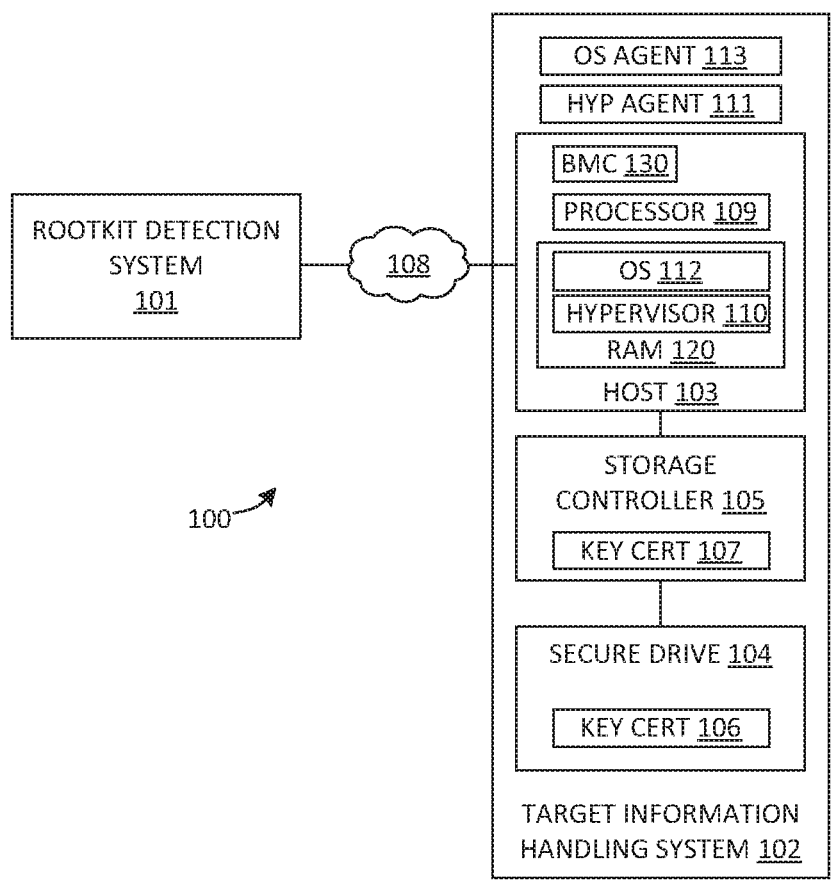
FIG. 1 illustrates a device management platform including a remote rootkit detection system.

FIG. 1 illustrates a system management environment 100 in accordance with disclosed subject matter. The system management environment 100 illustrated in FIG. 1 includes a rootkit detection system 101 and an information handling system, referred to herein as target information handling system 102, both coupled to a network 108. The target information handling system 102 includes a host 103 comprising a processor 109 and a system memory 120, a storage drive 104 and a storage controller 105. FIG. 1 illustrates additional resources of information handling system 102 including an operating system (OS) 112 and an OS agent 113.

In at least one embodiment, storage drive 104 is a secure drive that includes a factory-installed public-key certificate 106 signed by a trusted authority. The public-key certificate 106 may include or be derived from a serial number or other unique identifier of storage drive 104. The storage drive 104 may support an operation, referred to herein as a signed-data operation, to retrieve and digitally sign raw data from any data block.

The storage drive 104 may be configured to accept a firmware update if and only if the update is digitally signed. In at least some embodiments, public-key certificate 106 includes or supports specialized handling of particular operations or situations that may be or may have been a rootkit target. In one non-limiting example, storage drive 104 is configured to make spare blocks available for scanning or to zero out spare blocks before and after they are made available to host 103.

The storage controller 105 forwards requests for data storage drive 104. Storage controller 105 may be a secure storage controller including a unique public-key certificate 107. Storage controller 105 may also be configured to accept only those firmware updates that are signed.

The storage controller 105 illustrated in FIG. 1 may support an operation to obtain a signed enumeration of attached devices. Storage controller 105 may also be configured to perform secure drive operations on behalf of a legacy drive and to make RAID configuration markers and other special areas available for scanning.

The host 103 illustrated in FIG. 1 may be a managed target host that supports an operation to retrieve the list of attached controllers/drives generated by storage controller 105 as well as information on any installed hypervisor 110 or operating system 112.

In at least one embodiment, host 103 may be configured to return signed blocks of system memory 120. This functionality may be provided or supported by a management controller, commonly referred to as a baseboard management controller (BMC) 130 that is included in at least some embodiments of host 103. Otherwise, this functionality may be integrated into OS agent 113, subject to verification. Like storage drive 104 and storage controller 105, any BMC 130 included in host 103 may require signed firmware updates and provide access to special data areas. Beneficially, system management environment 100 and rootkit detection system 101 may continue to function properly, i.e., identify rootkits, even if firmware for BMC 130 is compromised.

In embodiments that include a hypervisor 110, a hypervisor agent 111 may support an operation to retrieve information on the host system, attached resources, as well as managed OS instances. The hypervisor agent 111 may also support operations to retrieve encryption parameters for any hypervisor-level volume or file-level encryption. The hypervisor agent 111 may also be configured to detect some rootkits by comparing actual data received from hypervisor 110 with expected data provided by rootkit detection system 101. This data may include, for example, data regarding memory and storage. The hypervisor 110 may host various existing rootkit detection algorithms which may be included within a class of resources referred to herein as anti-malware resources. system management environment 100 and rootkit detection system 101 may continue to function even if the hypervisor agent 111 is compromised. If necessary several agents can be nested, e.g., a Windows hypervisor emulating a Windows mobile operating system within a VMware virtual machine.

The OS agent 113 may include features similar to hypervisor agent 111. The OS agent 113 may provide information on other host agents or target systems (not depicted in FIG. 1). The hypervisor agent 111 may also provide encryption information regarding encryption parameters for OS-volume and file-level encryption. In some embodiments, encryption information may be provided for a subset of volumes and/or files, e.g., files that load prior to any anti-malware resources.

The OS agent 113 may also detect some rootkits by comparing OS data with detection system data and can be integrated with traditional anti-malware solutions. System management environment 100 and rootkit detection system 101 may continue to function even if OS agent 113 is compromised.

The rootkit detection system 101 may be configured to perform rootkit detection tasks, provide a management interface to management agents include hypervisor agent 111 and OS agent 113, and forward notifications. In at least one embodiment, rootkit detection system 101 requests and examines data blocks for the signatures of known rootkits or irregularities. It can emulate common file systems and encryption algorithms and is programed with knowledge of common OS boot processes. If blocks are encrypted, rootkit detection system 101 can request the applicable encryption key from the appropriate agent and verify the raw data blocks decrypt properly and do not contain malware.

In order to prevent disclosure of cryptographic keys, rootkit detection system 101 may include a dedicated tamper-resistant processor to perform cryptographic operations. Decryption operations may be limited to vital data. As used herein vital data encompasses data blocks and files related to the boot process, kernel-level code, drivers, and other system files that are critical to system function but have well-known and non-confidential contents.

The rootkit detection system 101 of FIG. 1 may be hosted on a management processor, a premises-based or other designated server, a network appliance, or cloud-implemented service. If a cloud service is used, system management environment 100 may include an on premise proxy host (not depicted in FIG. 1).

If rootkit detection system 101 detects or suspects a rootkit, rootkit detection system 101 may forward alerts via push notifications to mobile devices, email, and/or traditional management notifications such as SNMP traps. Alerts also may be displayed through the $113 and integrated with notification centers such as Windows Action Center.

When hosted within a dedicated server, appliance, or cloud service, the detection system can leverage caching and dedicated hardware to improve performance and efficiency of the detection process.

In at least one embodiment, rootkit detection messages generated by rootkit detection system 101 are encrypted and signed using public key cryptography to prevent a rootkit from moving data around in advance of the data being inspected or tampering with communications. Each request from rootkit detection system 101 may include an incremental or random sequence number to prevent replay attacks. Each request may include header information including a fully qualified device description (FQDD) or another type of consistent and generic identifier of a particular physical or logical device that abstracts the underlying architecture and implementation.

System management environment 100 implements a request interface that supports various requests a rootkit detection system 101 may send to a storage drive 104 or a target system. In at least one embodiment, the set of requests includes, at least, block requests, device/agent requests, and encryption requests.

An example block request may be of the form GetBlockSecure(BlockID) where BlockID identifies the requested block and which may include length and offset parameters. The GetBlockSecure request retrieves raw data contained in the applicable block of storage.

An example device/agent request may be of the form GetDeviceInfo( ) or GetAgentInfo( ) where the request may retrieve values for any one or more of the following attributes:
 DeviceID, which may include an FQDD as well as a serial number and/or service tag;
 DeviceCert indicating the device's public key certificate;
 DeviceType indicating the type of device, e.g., drive, controller, system, etc.;
 StorageInfo indicating the ID, size and layout of storage capabilities for primary and secondary or special storage areas;
 ChildDevice indicating attached drives and other subordinate devices;
 ParentDevice indicating a controller, host, or other parent device.

Figure 2:
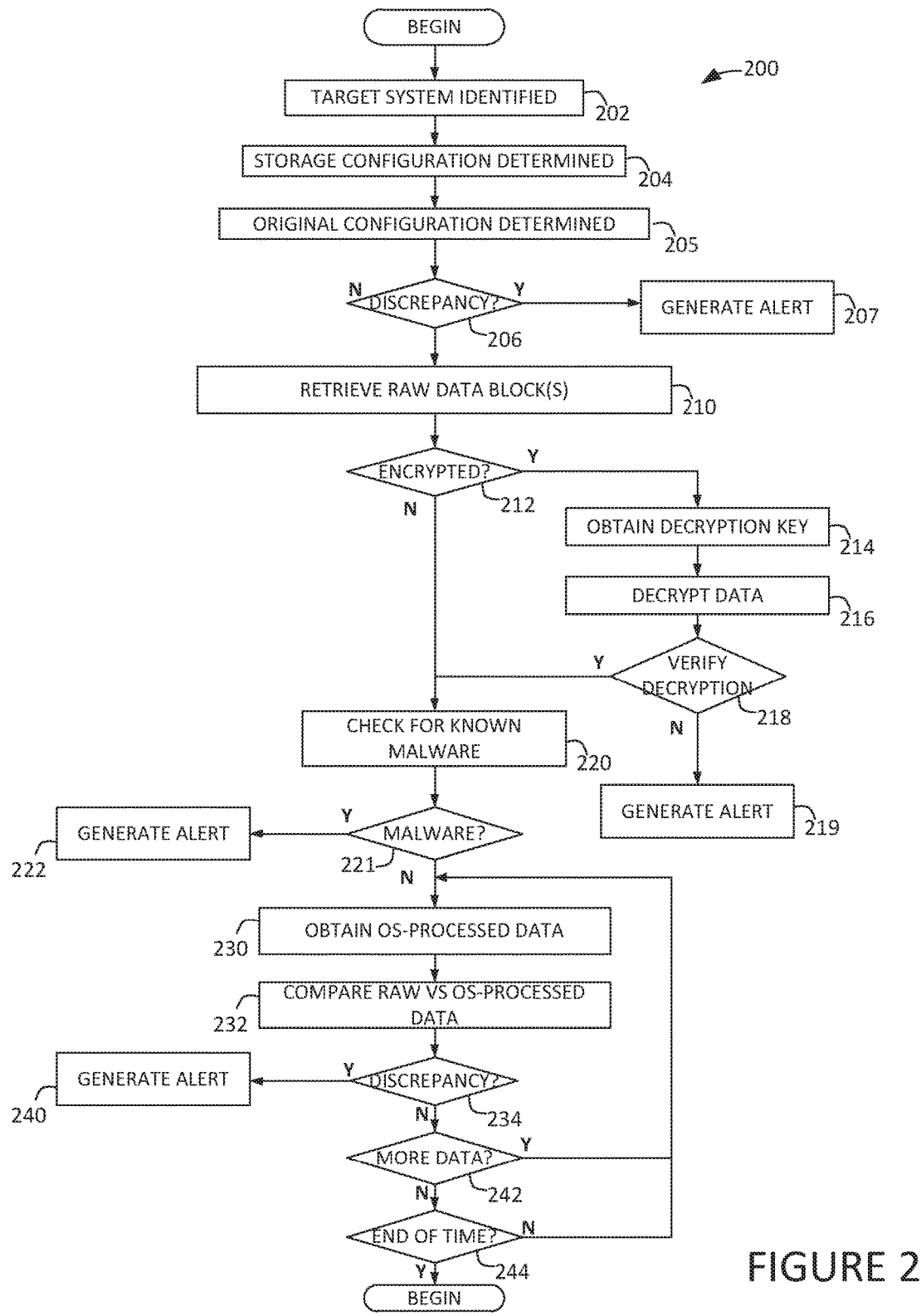
FIG. 2 illustrates a flow diagram of a detecting rootkits.

FIG. 2 illustrate a flow diagram of a rootkit detection process or method 200. Unless indicated otherwise, the operations represented in rootkit detection method 200 are performed by rootkit detection system 101 of FIG. 1 or an analogous information handling system.

The rootkit detection method 200 of FIG. 2 includes an initial operation in which a target system is included (operation 202), by automated discovery or manual addition, in a group of systems associated with rootkit detection system 101. A discovery mechanism using, as an example, a REST-based API such as a Redfish API, may be sufficient for purposes of identifying systems to monitor for rootkits because systems that fail to respond to basic network requests are, most likely, undesirable candidates to host a rootkit.

After discovering or adding a target system, the target system's current storage configuration can be determined (operation 204) using, for example, a GetDeviceInfo (StorageInfo) request as described above. The target's system original or as-built configuration may be determined (operation 205). The as-built configuration information may be maintained by a system manufacturer, supplier, or third party. The Quick Resource Locator (QRL) from Dell, Inc. is a web-accessible example of such a database. The configuration data obtained may then be compared (operation 206) to the original or as-built data.

The configuration determination operation may construct a topology of the applicable system, from the OS-layer to the drive layer, and an administrator can be alerted (operation 207) to any system with incomplete data or any system that does not match its as built configuration. This configuration determination operation suggests that aspects of rootkit detection method 200 may be most efficiently employed by an entity that not only maintains or has access to original configuration data, but also provides distributed management resources and services.

If a system's current storage configuration matches its as built configuration, the system may be registered for monitoring by the detection system and one or more of the system's disk blocks may be targeted for periodic examination. The examination of a data block may include retrieving raw data stored in the data block as represented in FIG. 2 by operation 210. Because disk blocks may be encrypted in at least some circumstance, the rootkit detection method 200 illustrated in FIG. 2 determines (operation 212) whether a particular data block or group of data blocks is encrypted. If so, the rootkit detection system 101 may obtain (operation 214) a decryption key from an agent operating within the environment in which the encryption is managed, e.g., the host OS. The detection system may then perform the decryption (operation 216) using its own implementation of the encryption algorithm and verify (operation 218) that the data decrypts correctly. If the data does not decrypt correctly, the administrator is alerted (operation 219).

Once the detection system has obtained unencrypted data, the rootkit detection method 200 illustrated in FIG. 2 proceeds to operation 220 where antivirus resources may determine whether the data has characteristics or exhibits symptoms of any known or predictably detectable malware. If malware is detection (operation 221), an administrator may be alerted (operation 222) if malware is detected. In at least some embodiments, the malware detection by rootkit detection system 101 in operation 222 may substantially or entirely replace malware detection operations performed by system-resident antivirus software. Delegating malware detection to rootkit detection system 101 may beneficially improve system performance by freeing up storage and processing resources for workload applications, rather than computing and comparing data hashes with known malware hashes. In addition, delegating malware detection to a dedicated rootkit detection system 101 may enable efficiencies For example, signatures can be cached for use across multiple systems, potentially resulting in lower total hardware and power consumption costs.

The rootkit detection method 200 illustrated in FIG. 2 continues to operation 230 upon determining that the data does not contain any known malware. In operation 230, rootkit detection method 200 obtains data resulting from accessing the data block via the target system's file system and/or driver stack and compares (block 232) the OS-processed data to the "raw" data obtained in operation 210. If a discrepancy between the OS-processed data and the raw data is detected (block 234), an alert is (generated block 240). If no discrepancy is detected, the method 200 may determine (block 242) if there is more data blocks to scan and, if so, whether an end of time limitation has elapsed (block 244). The end of time determination may be employed to limit rootkit detection to the time when a rootkit is most likely to perform an unauthorized operation, e.g., within the first ten minutes or so following reset.

As suggested by the preceding description, the rootkit detection system 101 may map a file retrieved by OS agent 113 to one or more data blocks that the rootkit detection system 101 can retrieve directly from storage drive 104 for comparison, after decrypting the raw data if necessary. Mapping OS-level files to hardware blocks may include accessing partition table layouts for file systems in common use, including, as examples, NTFS and ext3.

Assuming the disk firmware and private key are not compromised, a rootkit attempting to return inauthentic data for a block will be detected by the detection system. In addition, if the target does not return disk blocks for a request within a reasonable time, the administrator will be alerted.

Some embodiments of rootkit detection method 200 may use knowledge of the system boot process to focus requests on critical files, including, as one example, files that would be executed prior to loading of anti-malware services on a Host OS. For example, whereas the Windows boot loader, kernel, file system, and drivers referenced in the registry are critical to establishing a trusted computing base, user generated content is not. Focusing the toolkit detection on critical files enhances reliability and reduces the need to transmit encryption keys for sensitive data files. In addition, because any movement of the OS kernel would result in an inconsistent file system state and because the OS kernel is unlikely to be the target of file-system level encryption, the rootkit detection system 101 can examine the configuration of the target system can be examined remotely without executing any target system code.

Some embodiments may make use of temporal data to improve the efficiency of rootkit analysis. For example, rootkit detection system 101 might request and analyze data for 10 minutes immediately following a system boot, when a rootkit is most likely to be activated. Detection system loading can be managed by staggering system restarts.

Any one or more processes or methods described above, including processes and methods associated with the FIG. 2 flow diagram, may be embodied as a computer readable storage medium or, more simply, a computer readable medium including processor-executable program instructions, also referred to as program code or software, that, when executed by the processor, cause the processor to perform or otherwise result in the performance of the applicable operations.

A computer readable medium, which may also be referred to as computer readable memory or computer readable storage, encompasses volatile and non-volatile media, memory, and storage, whether programmable or not, whether randomly accessible or not, and whether implemented in a semiconductor, ferro-magnetic, optical, organic, or other suitable medium. information handling systems may include two or more different types of computer readable media and, in such systems, program code may be stored, in whole or in part, in two or more different types of computer readable media.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, firmware, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicate the presence of stated features, operations, elements, and/or components, but does not preclude the presence or addition of one or more other features, operations, elements, components, and/or groups thereof.

What is claimed is:

1. A rootkit detection method comprising:
    obtaining, from a storage subsystem of a target information handling system, first data comprising raw data stored in a particular data block of a storage drive within the storage subsystem, wherein obtaining the first data includes sending, by a system management resource, a management request for the particular data block;
    checking the first data for known malware; and
    responsive to detecting known malware in the first data, generating a malware alert;
    obtaining host configuration information from the target information handling system, wherein the host configuration information includes storage configuration information indicating storage controllers and storage drives associated with the target information handling system;

comparing a current storage configuration of the target information handling system to a previous storage configuration and, responsive to detecting a discrepancy, generating a storage configuration alert.

2. The method of claim 1, wherein the storage drive includes a public-key certificate, signed by a trusted authority, indicative of a unique identifier of the storage drive and wherein the first data includes a digital signature in accordance with the raw data and the public-key certificate and wherein checking the first data includes verifying the digital signature.

3. The method of claim 1, further comprising:
obtaining second data comprising data corresponding to an operating system access of the particular data block;
comparing the first data to the second data, and
responsive to detecting a discrepancy, generating a second alert.

4. The method of claim 1, wherein the system management resource comprises a rootkit detection system implemented as a system selected from:
a cloud based server;
a premise installed appliance;
a premise installed security server; and
a management controller of the target information handling system.

5. The method of claim 1, wherein the target information handling system includes a secure storage drive coupled to a managed host and wherein the managed host is configured to respond to the management request by returning raw data stored in the particular data block.

6. The method of claim 5, wherein the raw data comprises encrypted raw data and wherein the method includes:
requesting a decryption key from the target information handling system; and
responsive to receiving the decryption key, decrypting the encrypted raw data to obtain decrypted data, wherein checking the first data comprises scanning the decrypted data.

7. The method of claim 1, wherein the raw data comprises one or more files necessary to load an operating system hosted by a file system.

8. The method of claim 7, wherein checking the first data comprises comparing each of the one or more files necessary to load the operating system against at least one of:
an expected value; and
a verified digital signature.

9. The method of claim 7, further comprising:
emulating at least a portion of a boot process;
identifying accessed files comprising files accessed during the portion of the boot process; and
checking the accessed files for known malware.

10. The method of claim 9, wherein emulating at least a portion of the boot process comprises emulating the boot process for a particular interval following an initiation of system boot and wherein the accessed files comprises files accessed by the boot process within the particular interval.

11. The method of claim 7, wherein the target information handling system comprises:
a file system hosting a hypervisor; and
nested file systems comprising data files representing storage of guest operating systems and wherein the raw data comprises files necessary to load the guest operating systems.

12. A rootkit detection method comprising:
obtaining, from a storage subsystem of a target information handling system, first data comprising raw data stored in a data block of a storage drive within the storage subsystem, wherein the target information handling system comprises a managed host system configured to respond to a management request for host configuration information by returning configuration lists indicating storage controllers and storage drives associated with the target information handling system;
checking the first data for known malware;
responsive to detecting known malware in the first data, generating a malware alert;
sending a management request for current host configuration information for the target information handling system; and
comparing a current storage configuration of the target information handling system to a previous storage configuration and, responsive to detecting a discrepancy, generating a storage configuration alert.

13. The method of claim 12, further comprising:
obtaining from the storage subsystem of the target information handling system, unallocated data comprising raw data stored in an unallocated data block of the storage drive within the storage subsystem;
scanning the unallocated data for known malware; and
responsive to detecting known malware in the unallocated data, generating a unallocated access alert.

14. The method of claim 12, wherein the target information handling system is further configured to respond to management requests for a block of system RAM by returning digitally signed data corresponding to raw data in the block of system RAM.

15. The method of claim 12, wherein comparing the current storage configuration information includes:
retrieving as-built configuration information, indicative of an original configuration of the storage controllers and storage drives attached to the target information handling system; and
comparing the as-built configuration information to the current configuration information.

16. The method of claim 12, wherein the target information handling system is further configured to respond to management requests for host information by returning configuration lists indicating at least one of: hypervisors and operating systems of the target information handling system.

17. The method of claim 12, wherein the storage drive includes a public-key certificate, signed by a trusted authority, indicative of a unique identifier of the storage drive and wherein the first data includes a digital signature in accordance with the raw data and the public-key certificate and wherein checking the first data includes verifying the digital signature.

18. The method of claim 12, wherein the target information handling system is further configured to respond to management requests for a block of system RAM by returning digitally signed data corresponding to raw data in the block of system RAM.

19. The method of claim 12, further comprising:
obtaining, from the storage subsystem of the target information handling system, unallocated data comprising raw data stored in an unallocated data block of the storage drive within the storage subsystem;
scanning the unallocated data for known malware; and
responsive to detecting known malware in the unallocated data, generating a fourth alert.

* * * * *